United States Patent [19]

Boyer

[11] Patent Number: 4,792,708
[45] Date of Patent: Dec. 20, 1988

[54] FORCE MOTOR, MULTIPLE, PARALLEL ELEMENT LINEAR SUSPENSION

[75] Inventor: Kent R. Boyer, Valencia, Calif.
[73] Assignee: HR Textron, Inc., Valencia, Calif.
[21] Appl. No.: 124,005
[22] Filed: Nov. 23, 1987
[51] Int. Cl.⁴ ............... H02K 33/00; F16K 31/08; G05D 16/00
[52] U.S. Cl. .............................. 310/15; 267/181
[58] Field of Search ........... 251/129.17, 331; 267/161, 162, 163, 181; 310/15; 248/543

[56] References Cited

U.S. PATENT DOCUMENTS

| | | | |
|---|---|---|---|
| 2,939,663 | 6/1960 | Suozzo | 248/543 |
| 3,067,404 | 12/1962 | Hildebrandt | 310/15 |
| 4,238,845 | 12/1980 | Haggard et al. | 267/161 |
| 4,458,344 | 7/1984 | Coogler | 267/161 |
| 4,638,830 | 1/1987 | Brown et al. | 251/129.17 |

Primary Examiner—Patrick R. Salce
Assistant Examiner—D. L. Rebsch
Attorney, Agent, or Firm—Nilsson, Robbins, Dalgarn, Berliner, Carson & Wurst

[57] ABSTRACT

A suspension system for an electromagnetic linear actuator armature includes plural suspension discs adjustably secured to the armature of the linear actuator. The discs include tortuous-path spring arms between inner and outer rims. The rims are stacked between annular spacers and retained by two annular clamps.

9 Claims, 2 Drawing Sheets

FORCE MOTOR, MULTIPLE, PARALLEL ELEMENT LINEAR SUSPENSION

BACKGROUND OF THE INVENTION

This invention relates generally to electromagnetic linear actuators and more specifically to a mechanical suspension system for such actuators.

Electromagnetic linear actuators commonly referred to as linear force motors or force motors require a suspension system which imposes a well defined, bi-directional force between the stator and armature of the linear force motor. Such a suspension system normally requires the force vector to be applied in a co-linear manner with the axis of motion of the force motor armature. In addition, the magnitude of force which is applied by the suspension system is, in general, linearly related to the relative displacement between the stator and the armature of the force motor. Furthermore, it is usually required that the suspension system must be capable of adjustment, so that the null or zero magnitude force can be imposed for any given relative position between the stator and armature of the force motor.

Traditionally the requirements for the suspension system of linear force motors has been met through the utilization of helical springs which are applied to one or both ends of the force motor armature. The utilization of such springs generate a number of problems. First of all, when one spring is located on each side of the reciprocating armature the overall length of the reciprocating motor can be excessive and the device cannot be utilized in areas where space is at a premium. In addition, adjustment is often difficult since each side of the motor must be accessible for that purpose. However, when the springs are both located on one end of the armature the containment mechanism is complex in order to provide the appropriate adjustment capabilities. In addition to the foregoing, when a helical spring suspension system is utilized, some modicum of loading must be maintained to cause the suspension system to work properly. This is required to prevent unloading for bi-directional motion about a neutral position. Such preloading creates an undesirable sustained stress in each member of the suspension system, and such stress must also be subject to appropriate control and adjustment, which further complicates the situation.

The best prior art known to applicant are U.S. Pat. Nos. 2,264,902, 2,939,663 and 3,067,404.

DETAILED DESCRIPTION

Figure 1:
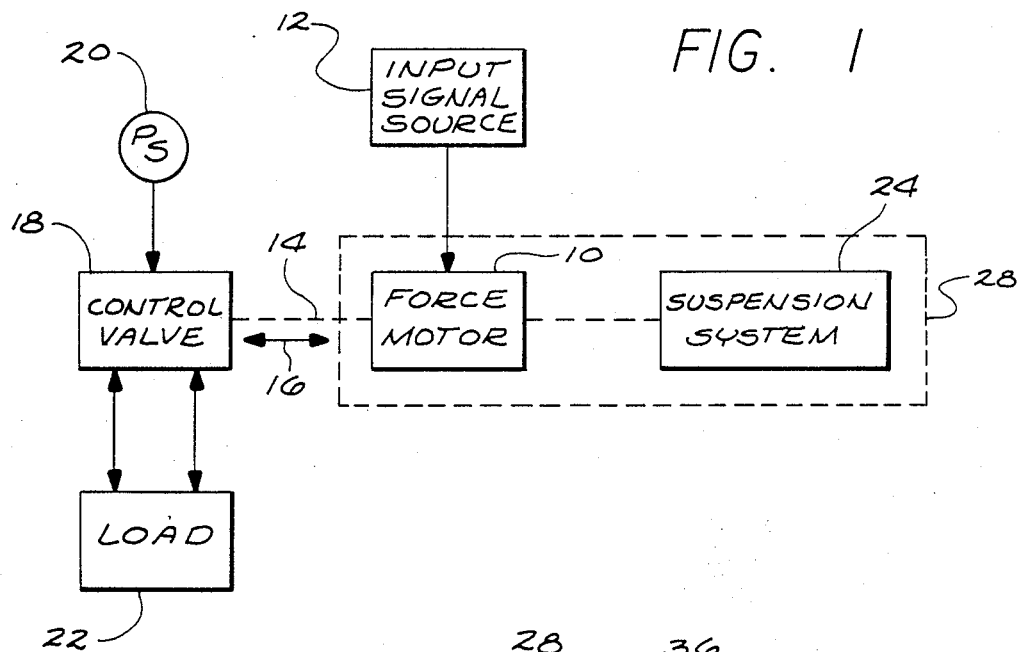
FIG. 1 is a block diagram showing a system utilizing a force motor having a suspension system constructed in accordance with the present invention.

Referring now to the drawings and more particularly to FIG. 1 there is shown in block diagram a control system utilizing a linear force motor. As is therein shown, the force motor 10 responsive to the application of electrical input signal(s) from a source 12 thereof moves an armature indicated by the dash line 14 reciprocally as shown by the arrow 16. Movement of the armature 14 in turn actuates a control valve 18 which controls the application of hydraulic fluid under pressure from the source 20 thereof to a load 22. Such a system is well known in the art and does not require additional description. In order to function properly, the force motor armature 14 must be properly suspended as indicated by the suspension system 24 which, in accordance with the preferred embodiment of the present invention, is affixed to one end of the armature 14 as shown. The suspension system may be disposed at either end of the armature without departing from the scope of the invention.

Figure 2:
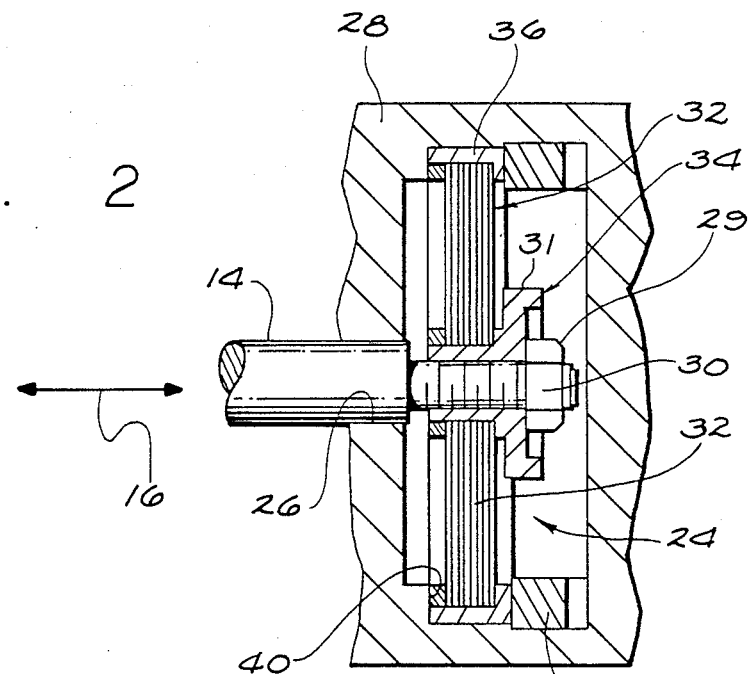
FIG. 2 is a fragmentary view illustrating the suspension system of the present invention.

As is more fully shown in FIG. 2 the armature 14 of the force motor extends through an opening 26 within the stator or housing 28. The end 30 of the armature is threaded and threadably receives thereon the suspension system 24. The suspension system 24 includes a plurality of discs 32 which are held in place upon a hub means 34. An appropriate outer cylindrical retainer 36 is used to position the system 24 within the stator 28 against a shoulder 40 formed therein. An appropriate retention nut 42 may be secured in place within the stator 28 to retain the suspension system 24 within the stator or housing 28.

Figure 3:
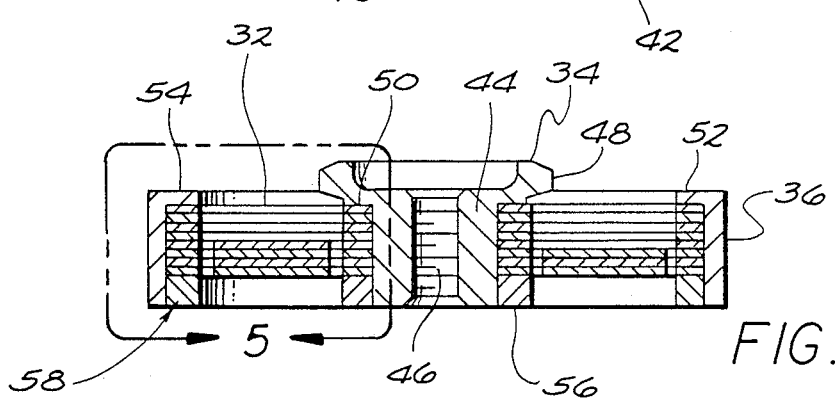
FIG. 3 is a cross sectional view illustrating the suspension system detached from the armature force motor.

As illustrated now more particularly in FIG. 3 the suspension system 24 includes the plurality of discs 32 which are positioned upon the hub means 34. The hub means include a body 44 having a centrally disposed threaded opening 46 therethrough. At one end of the body 44 there is an outwardly extending flange 48, against which the inner ends or rims 50 of the discs 32 are seated. The outer cylindrical retainer 36 defines an inwardly directed lip 52 against which the outer peripheral ends or rims 54 of the discs 32 are seated. An internal retaining ring 56 is positioned around the opposite end of the body 44 from which the flange protrudes to seat against the inner rims 50 of the discs 32, to thus retain them in position on the hub 34. An outer retaining ring 58 is disposed within the outer cylindrical retainer 36 to seat against the outer peripheral rims 54 of the discs 32, to hold them in position within the cylindrical retainer 36. The retainer rings 56 and 58 are permanently secured in position on the outer cylindrical retainer 36 and the hub 34.

Figure 4:
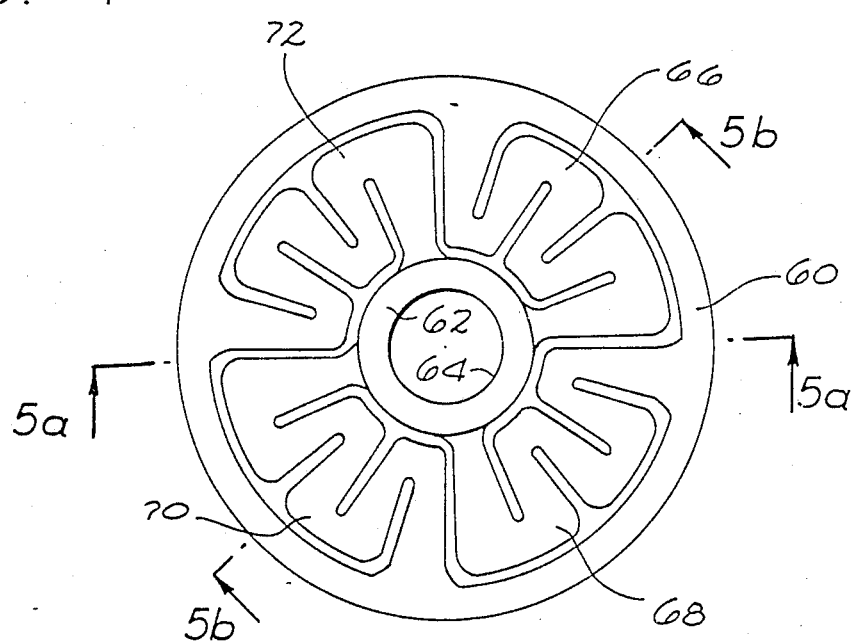
FIG. 4 is a plan view illustrating one of the suspension discs constructed in accordance with the present invention.

By referring now more particularly to FIG. 4 a more detailed illustration of the construction of each of the suspension discs may be obtained. As is therein shown each suspension disc includes an outer rim 60 and an inner rim 62 defining a central opening 64 therethrough. Interconnected between the outer and inner rims 60 and 62, respectively, are a plurality of ribbon-like members 66, 68, 70 and 72. As shown for example specifically with respect to the ribbon-like member 66, one end 74 thereof is connected to the outer rim 60 while the other end 76 thereof is connected to the inner rim 62. As is illustrated the ribbon-like member 66 between the ends 74 and 76 thereof defines a tortuous path which extends over substantially 90 degrees of the disc. The disc as shown in FIG. 4 is formed preferably by etching a solid disc of steel or similar material to provide the ribbon-like members 66 through 72 as above described. As will be appreciated that through these ribbon-like members each disc has independent parallel load paths of ripstop construction. The opening 64 is defined to receive the body 44 of the hub 34. The peripheral rim 60 has a diameter such as to be received within the outer cylindrical retainer 36 as above described.

Figure 5:
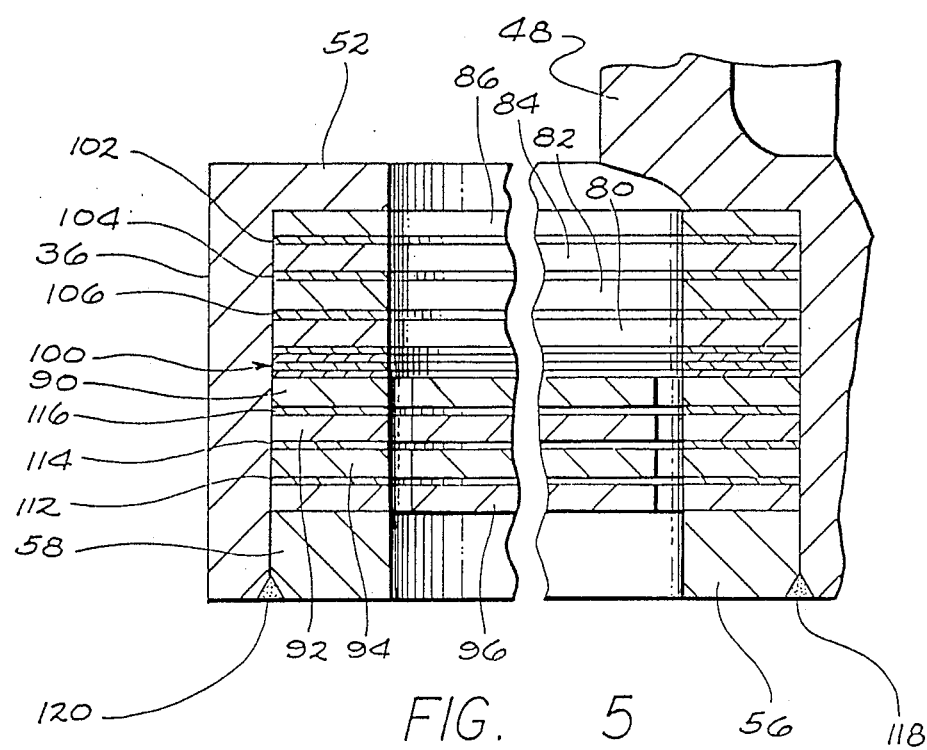
FIG. 5 illustrates in greater detail the retention of the suspension discs and is an expansion of the area of FIG. 3 surrounded by the line 5 with the cross section of the top area taken through line 5a of FIG. 4 and the bottom area through the line 5b thereof.

By reference now more specifically to FIG. 5 the precise disposition of the suspension discs within the suspension system is more fully illustrated.

As is therein shown a plurality of discs 80, 82, 84, 86 and 90, 92, 96 is disposed within the holder or outer cylindrical retainer 36. Each of the discs is separated by a spacer 102, 104, 106 and 112, 114, 116 with a plurality of spacers 100 disposed between and separating one half of the discs. Although FIG. 5 illustrates only eight total discs, it will be understood that any number desired or required for a particular application may be selected. The discs 80 through 86 are disposed to be oriented in a first direction while the discs 90, 92, 94 and 96 are inverted with regard to the discs 80 through 86. This inversion of the discs eliminates any torsional inputs to the armature 14 which would be induced by linear displacement during operation.

The discs 90 through 96 are also rotated about the axis transverse therethrough to provide a more uniform radial stiffness to the suspended system 24. Preferably such rotation is through an angle of approximately 35 to 55 degrees. To properly illustrate this positioning, the discs 80 through 86 are shown in FIG. 5 as if the cross sectional was taken about lines 5a while the discs 90 through 96 are shown as if the cross section were taken about lines 5b, although, it will be understood that the entire cross section is taken about a single line, either 5a or 5b.

By provision of the spacers 102 through 106 and 112 through 116 as well as the group of spacers 100 non-contacting motion between the discs is assured. In addition, the group of spacers 100 may be varied to accommodate more or less the number of suspension discs that may be utilized in any particular suspension system. It will also be recognized that the stiffness of the suspension system may also be tailored for any particular application through selection of the thickness of the suspension discs since it will be apparent that the linear elasticity in the axial direction is formed by the summation of the elemental disc mechanical bending and torsional elasticities.

Once the appropriate desired number of suspension discs and spacers have been assembled within the holder 36 the inner and outer retainer rings 56 and 58 are secured in place to clamp and preload the discs and spacers between the flange 48 and lip 52 and the respective retainers 56 and 58. Thereafter the retainer rings are permanently secured in place, while preloaded, as by welding as shown at 118 and 120 to provide a permanently joined suspension system. In such a system mechanical hysteresis is virtually non-existent for small amplitude axial motion because the spacers prevent interelement coulomb friction losses.

Once the suspension system has been constructed it is disposed upon the threaded end 30 of the armature 14 and is then secured in place within the stator 28 as above described in conjunction with FIG. 2. Once the suspension system has been secured in place additional adjustment may be obtained by rotating the threaded armature 14 to thus position the armature and stator relative to each other axially as desired to provide the desired null position. Once the null position has been obtained a lock nut 29 may be secured in position to retain the desired adjustment. The outer periphery 31 of the flange 48 may be provided with a hexagonal or other geometric form to receive a tool to apply a counter torque while the lock nut is being installed to prevent torsional stress within the suspension discs.

If required, the suspension disc assembly may be suspended within fluid and as a result of the large area provided by the disc surfaces a very high viscous damping may be provided.

It will be recognized by those skilled in the art that the single unitized suspension system, constructed as above described and illustrated, provides excellent bi-directional restraint to the force motor without applying preloads thereto. Through utilization of flat discs a very efficient space/weight utilization and low inertia is provided for enhanced dynamics. by providing multiple parallel element construction in the suspension system a much higher reliability through fault tolerance is available.

What is claimed is:

1. A suspension systsem for a linear force motor having a moveable armature comprising:
    a plurality of discs each defining a central opening therethrough and have a peripheral rim;
    first spacer members at said peripheral rim disposed between adjacent ones of said discs;
    second spacer members at said opening disposed between adjacent ones or said discs;
    a holder means for receiving and securing said discs and said first spacer members at the peripheral rim thereof;
    hub means received within said central openings through said discs for securing said discs and said second spacer members at said opening; and
    means for securing said hub means on said armature.

2. A suspension system as defined in claim 1 wherein each of said discs further includes an inner rim defining said opening and a plurality of ribbon-like members each of which is connected at one end thereof to said inner rim and at the opposite end thereof to said peripheral rim.

3. A suspension system as defined in claim 2 wherein said ribbon-like members are disposed equiangularly about said disc.

4. A suspension system as defined in claim 3 wherein each of said ribbon-like members extends over approximately ninety degrees of said disc and defines a tortuous path.

5. A suspension system as defined in claim 1 wherein said holder is a cylinder having an inwardly directed lip and a first retainer ring member disposed within said cylinder is opposed to said lip, said peripheral rim of said discs and said first spacer members being clamped between said lip and said first retainer ring.

6. A suspension system as defined in claim 5 wherein said hub means includes a body having first and second ends and defining a central opening therethrough and having an outwardly extending flange at said first end, a second retainer ring disposed opposed to said flange, said inner rims of said discs and said second spacer members being clamped between said flange and said second retainer ring.

7. A suspension system for a linear force motor having a moveable armature comprising:

a plurality of discs each defining a central opening therethrough and having a peripheral rim;

said plurality of discs being N in number and wherein a first N/2 of said discs are oriented in a first direction and a second N/2 of said discs are oriented in a direction opposite said first direction;

spacer means disposed between adjacent ones of said discs;

a holder means for receiving and securing said discs at the peripheral rim thereof including a cylinder having an inwardly directed lip and a first retainer ring member disposed within said cylinder opposed to said lip, said peripheral rim of said discs being clamped between said lip and said first retainer ring;

hub means received within said central openings through said discs including a body having first and second ends and defining a central opening therethrough and having an outwardly extending flange at said first end, a second retainer ring disposed opposed to said flange, said inner rims of said discs being clamped between said flange and said second retainer ring; and means for securing said hub means on said armature.

8. A suspension system as defined in claim 7 wherein said second N/2 of said discs are angularly displaced relative to said first N/2 of said discs.

9. A suspension system as defined in claim 8 wherein said central opening in said body is threaded and said force motor armature is threaded, said armature being threadably received within said opening for adjusting said force motor armature null position and which further includes means for securing said null position.

* * * * *